United States Patent
Koizumi et al.

(10) Patent No.: US 7,001,054 B2
(45) Date of Patent: Feb. 21, 2006

(54) VEHICULAR LAMP

(75) Inventors: Hiroya Koizumi, Shizuoka (JP);
Kazunori Natsume, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 119 days.

(21) Appl. No.: 10/798,489

(22) Filed: Mar. 11, 2004

(65) Prior Publication Data

US 2004/0208019 A1   Oct. 21, 2004

(30) Foreign Application Priority Data

Mar. 11, 2003   (JP) .................. P.2003-065023

(51) Int. Cl.
*F21S 8/10* (2006.01)
*F21V 21/00* (2006.01)

(52) U.S. Cl. .............. 362/545; 392/511; 392/517; 392/297; 392/555; 392/582

(58) Field of Classification Search ............ 362/545, 362/297, 298, 300, 302, 304, 511, 517, 518, 362/555, 560, 582; 385/31, 38, 43, 146, 385/901
See application file for complete search history.

(56) References Cited

U.S. PATENT DOCUMENTS 6,356,394 B1 *   3/2002   Glienicke .................. 359/641
6,511,215 B1 *   1/2003   Hashigaya ................. 362/515

FOREIGN PATENT DOCUMENTS

JP    4-40405      4/1992
JP    11-306810    11/1999

* cited by examiner

*Primary Examiner*—John Anthony Ward
*Assistant Examiner*—Mark Tsidulko
(74) *Attorney, Agent, or Firm*—Koda & Androlia (57) ABSTRACT

A vehicular lamp including, within its lamp chamber, a reflector 14, a led 20 disposed behind the reflector 14 and a mushroom-shaped light guide 30 that extends coaxially with the led 20 and guides light emitted from the led 20 to the reflector 14. The light guide 30 has an umbrella portion 40 at its front end and a plane of incidence 33, which guides light from the led 20 into the light guide 30, at its rear end. The umbrella portion 40 has a first light emitting surface 42 for emitting light guided into the light guide 30 in the forward direction, reflection surfaces 44 and 46 for internally reflecting the guided light in the rearward direction and radially outward direction, and a second light emitting surface 48 for emitting the internally reflected light toward the reflector 14.

10 Claims, 5 Drawing Sheets

PRIOR ART

VEHICULAR LAMP

BACKGROUND OF THE INVENTION

1. Field of the Invention

The present invention relates to a vehicular lamp and more particularly to a vehicular lamp that employs a light emitting device such as a light emitting diode (called an "LED") as a light source thereof.

2. Prior Art

A vehicular lamp that includes an LED which is the light source and a reflector which reflects light from the LED is disclosed in Japanese Patent Application Laid-Open (Kokai) No. 11-306810.

Figure 5:
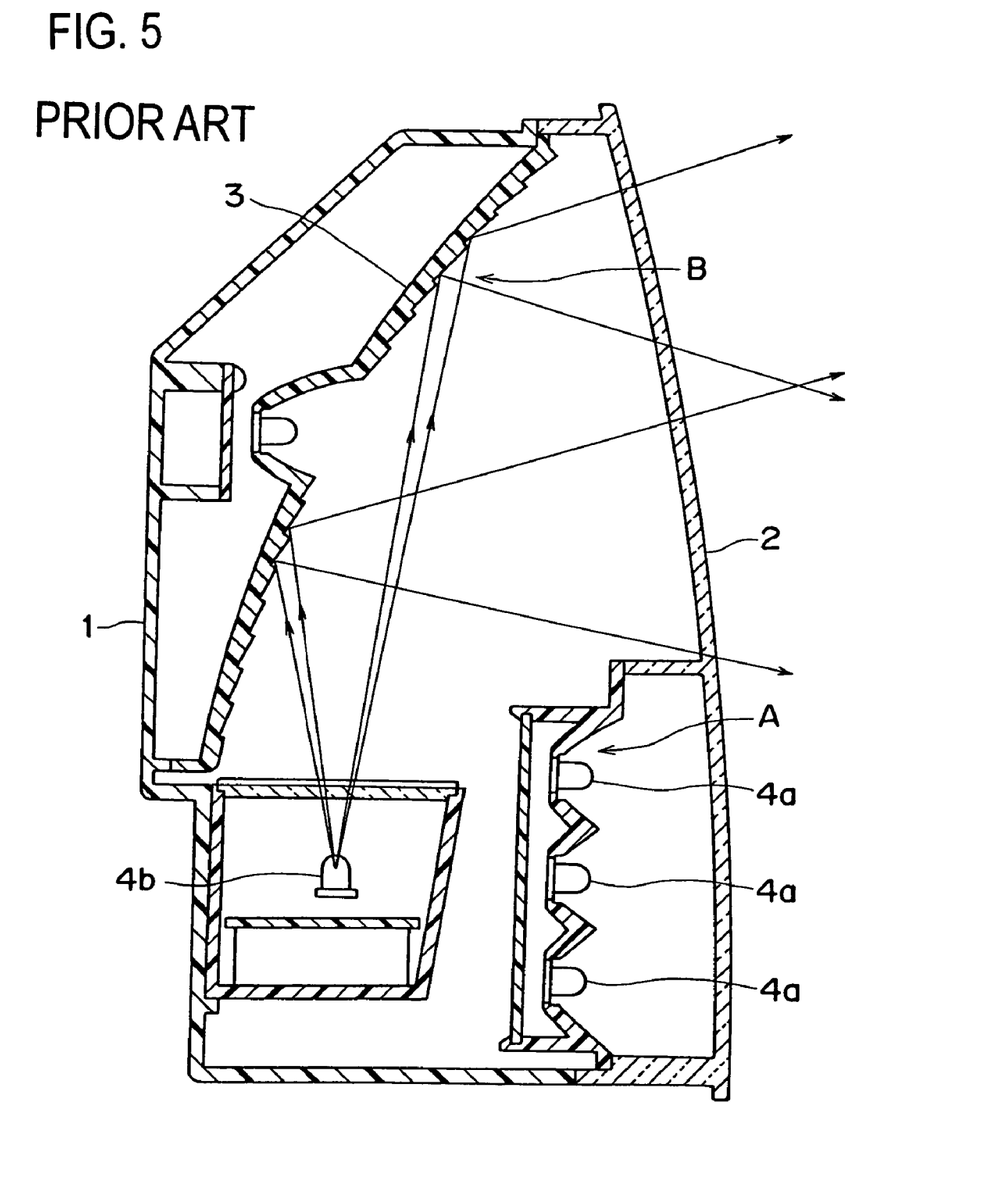
FIG. 5 is a sectional view of a conventional vehicular lamp.

This lamp is constructed such that, as shown in FIG. 5, within the lamp chamber defined by a lamp body 1 and a front lens 2, a plurality of LEDs 4a are provided to face forward (right side in FIG. 5), and a single LED 4b is provided below a reflector 3 to face upward (top side in FIG. 5). Thus, the lamp of this prior art includes a direct light emitting type lamp structure A, which distributes light emitted from the LEDs 4a mainly directly in the forward direction, and a reflection type lamp structure B, which reflects light emitted from the LED 4b and distributes it in the forward direction by the reflector 3.

However, in the direct light emitting type lamp structure A, so as to emit light emitted from the LEDs 4a that have a high directivity in a large area of the front lens 2, a large number of LEDs are correspondingly required. This causes a problem of high cost.

In the reflection type lamp structure B, the LED 4b is disposed at a position diagonally in front of and below the reflector 3; and thus there is a problem that the lamp structure is complicated.

With the above prior art lamp in mind, the inventors of the present application conceived a structure in which "a mushroom-shaped light guide in which an umbrella portion is formed at its front end is used for internal reflection of light which is emitted from an LED and is incident from the rear end portion of the bar-shaped base portion in the light guide such that the light becomes parallel light fluxes by an internal reflection surface formed in the umbrella portion at the front end, thus emitting the light toward a reflector." The inventors made a prototyped of such a light guide, and it was confirmed that such light guide solves the problems of the prior art lamp structure; and the present invention was made.

SUMMARY OF THE INVENTION

The present invention is created in consideration of the above-described problems of the prior art vehicular lamps and is based on the findings of the inventors described above.

It is an object of the present invention to provide a vehicular lamp whose lamp structure having an LED as its light source is not complicated and which allows light emission from a large area of the front lens by a single LED by an employment of a mushroom-shaped light guide that has an umbrella portion at a front end of a bar-shaped base portion.

The above object is accomplished by a unique structure of the present invention for a vehicular lamp that includes, within a lamp chamber defined by a lamp body and a front lens, a reflector, an LED which is light source of the lamp and is provided in an area behind the reflector, a light guide in which an umbrella portion is formed at a front end of a bar-shaped base portion thereof and which is provided in front of the LED so as to be substantially coaxial with the optical axis of the LED so as to guide light emitted from the LED to the reflector; and in this structure, the rear end portion of the bar-shaped base portion has a plane of incidence that guides light emitted from the LED into the light guide in a form of substantially parallel light fluxes; and the umbrella portion of the light guide has a first light emitting surface that emits a part of guided light within the bar-shaped base portion in a forward direction of the lamp, an internal reflection surface that internally reflects a part of guided light outward in a radial direction of the umbrella portion, and a second light emitting surface that emits the internally reflected light toward the reflector.

In this first aspect of the present invention, light emitted from the LED and incident to the light guide from (the plane of incidence of) the rear end portion of the bar-shaped base portion is guided in the forward direction within the bar-shaped base portion in the form of substantially parallel light fluxes. A part of this guided light is emitted in the forward direction from the first light emitting surface of the umbrella portion, while the rest of the guided light is internally reflected by the internal reflection surface of the umbrella portion and changes its direction to the outside in a radial direction so as to be emitted out of the second light emitting surface of the umbrella portion and directed toward the reflector. In other words, a part of the light emitted from the LED that is incident to the bar-shaped base portion of the light guide arranged in front of the LED is guided to the reflector through the internal reflection surface and the second light emitting surface of the umbrella portion of the light guide, and then such light is reflected by the reflector to be distributed in the forward direction, whereby the light is emitted from a reflector-corresponding area of the front lens.

In this structure, since the light guide extends in front of the reflector, the light reflected by the reflector would be partially blocked by (the umbrella portion of) the light guide, and thus, a light guide-corresponding area of the front lens might appear as a shadow. However, since light directly emitted in the forward direction from the first light emitting surface of the umbrella portion is guided to the light guide-corresponding area of the front lens, such light suppresses the shadow.

The light guide can be constructed such that its bar-shaped base portion is, for example, inserted in a hole provided in the reflector so that the bar-shaped base portion is disposed near the reflector. The bar-shaped base portion can be thus easily fixed, and it can be held by the reflector with any appropriate fixing means.

In the second aspect of the present invention, the first light emitting surface is a convex surface for diffusing light to be emitted therethrough.

In this structure, diffused light emitted in the forward direction from the first light emitting surface (convex surface) of the umbrella portion is guided to the light guide-corresponding area of the front lens on which the shadow might appear. Accordingly, differences in light emission in the reflector-corresponding area of the front lens can be reduced.

Diffusing of the light emitted from the first light emitting surface can be made by a concave surface instead of the above-described convex surface. However, with the concave surface, light emitted from the concave surface might be reflected by the internal reflection surface provided on the outer side in a radial direction of the concave surface.

Therefore, the convex surface that temporarily condenses light and then diffuses the light is preferable.

In the third aspect of the present invention, the internal reflection surface is comprised pf a first reflecting surface, which is set tilted at an angle substantially 45 degrees with respect to an optical axis of the bar-shaped base portion, and a second reflecting surface, which reflects light internally reflected by the first reflecting surface in the rearward direction.

In this structure of the present invention, a part of light guided within the bar-shaped base portion becomes substantially orthogonal to the optical axis of the bar-shaped base portion by internal reflection by the first reflecting surface. Further, by internal reflection of this light by the second reflecting surface, light is guided to a predetermined area of the reflector that includes a position at which the light guide is provided.

Moreover, light emitted from the LED that is incident to the bar-shaped base portion of the light guide is guided in the forward direction within the bar-shaped base portion in the form of substantially parallel light fluxes, and a part of the light guided is internally reflected by the first reflecting surface of the umbrella portion and becomes substantially orthogonal to the optical axis of the bar-shaped base portion. Therefore, the second reflecting surface and the second light emitting surface can be simply designed by using the umbrella portion's central axis, which is substantially orthogonal to the optical axis of the bar-shaped base portion taken, as a reference; and thus, the optical design of the light guide is correspondingly easy.

In the fourth aspect of the present invention, the bar-shaped base portion of the light guide is constructed of a cylinder that has a substantially constant outer diameter in its axial direction; and the umbrella portion has its central axis coincident with the optical axis of the bar-shaped base portion, and the internal reflection surface and second light emitting surface of the umbrella portion extend in a ring shape from the entire circumference of the first light emitting surface in a concentric fashion.

In this structure, the central axis of the umbrella portion coincides with the optical axis of the bar-shaped base portion. Thus, when designing the first light emitting surface, the internal reflection surface and the second light emitting surface, it is sufficient to merely design a sectional shape (two dimensional sectional shape) for the umbrella portion along the optical axis of the bar-shaped base portion. Thus, designing of the umbrella portion is easy.

Furthermore, in the fifth aspect of the present invention, the second light emitting surface of the light guide is in a concave shape that diffuses light to be emitted therethrough only outward in the radial direction of the umbrella portion.

With this structure, light emitted from the second light emitting surface of the umbrella portion and directed toward the reflector is diffused when being emitted from the second light emitting surface (concave surface). Thus, such light is guided to a large area of the reflector. In particular, since light emitted from the second light emitting surface (concave surface) is diffused only outward in the radial direction of the umbrella portion, there is no possibility that the light directed toward the reflector from the second light emitting surface is reflected by the bar-shaped base portion that extends toward the front of the reflector.

DETAILED DESCRIPTION OF THE INVENTION

Hereafter, embodiments of the present invention will be described in detail.

Figure 1:
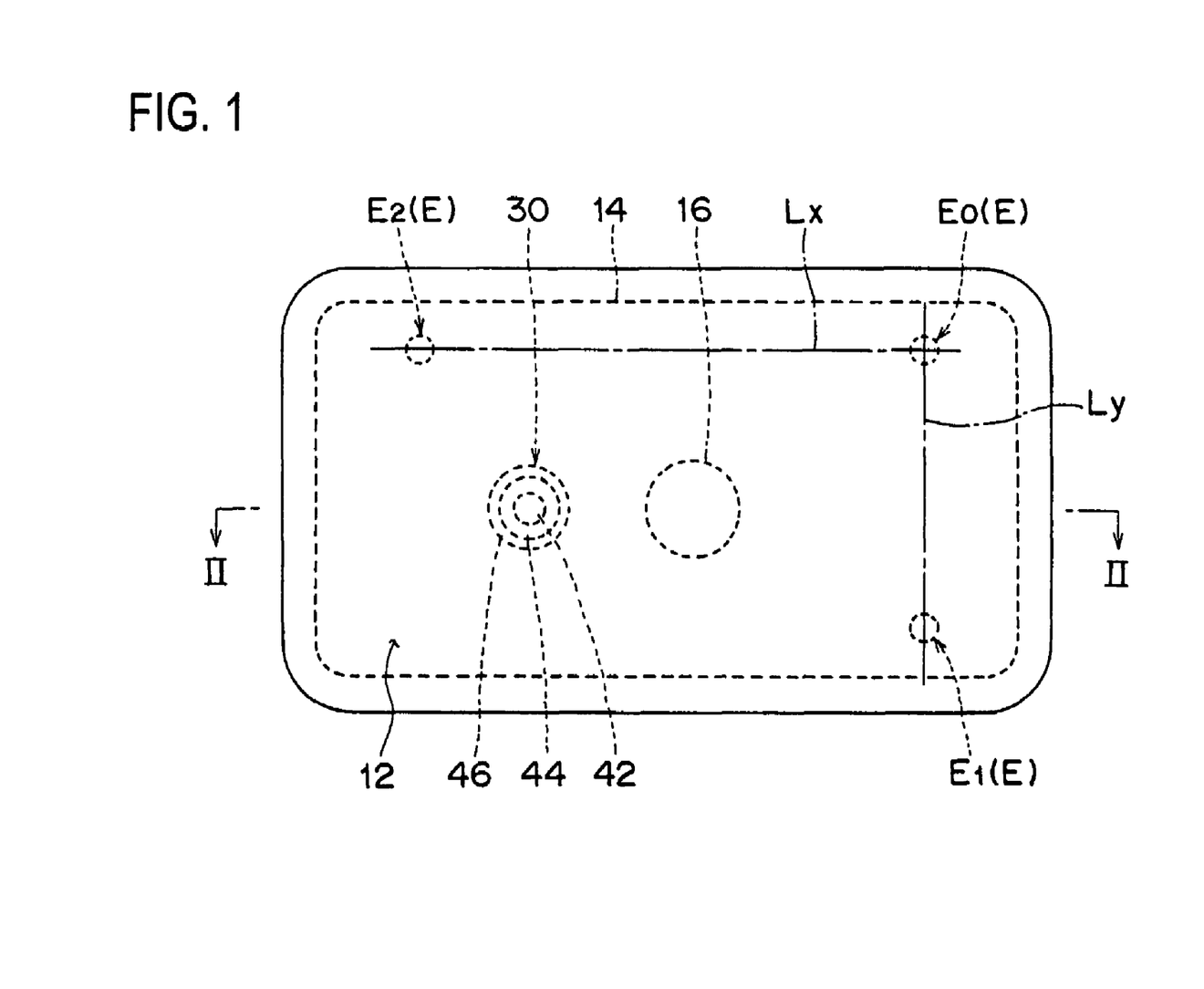
FIG. 1 is a front elevational view of the automotive headlamp incorporating a clearance lamp according to a first embodiment of the present invention.
Figure 2:
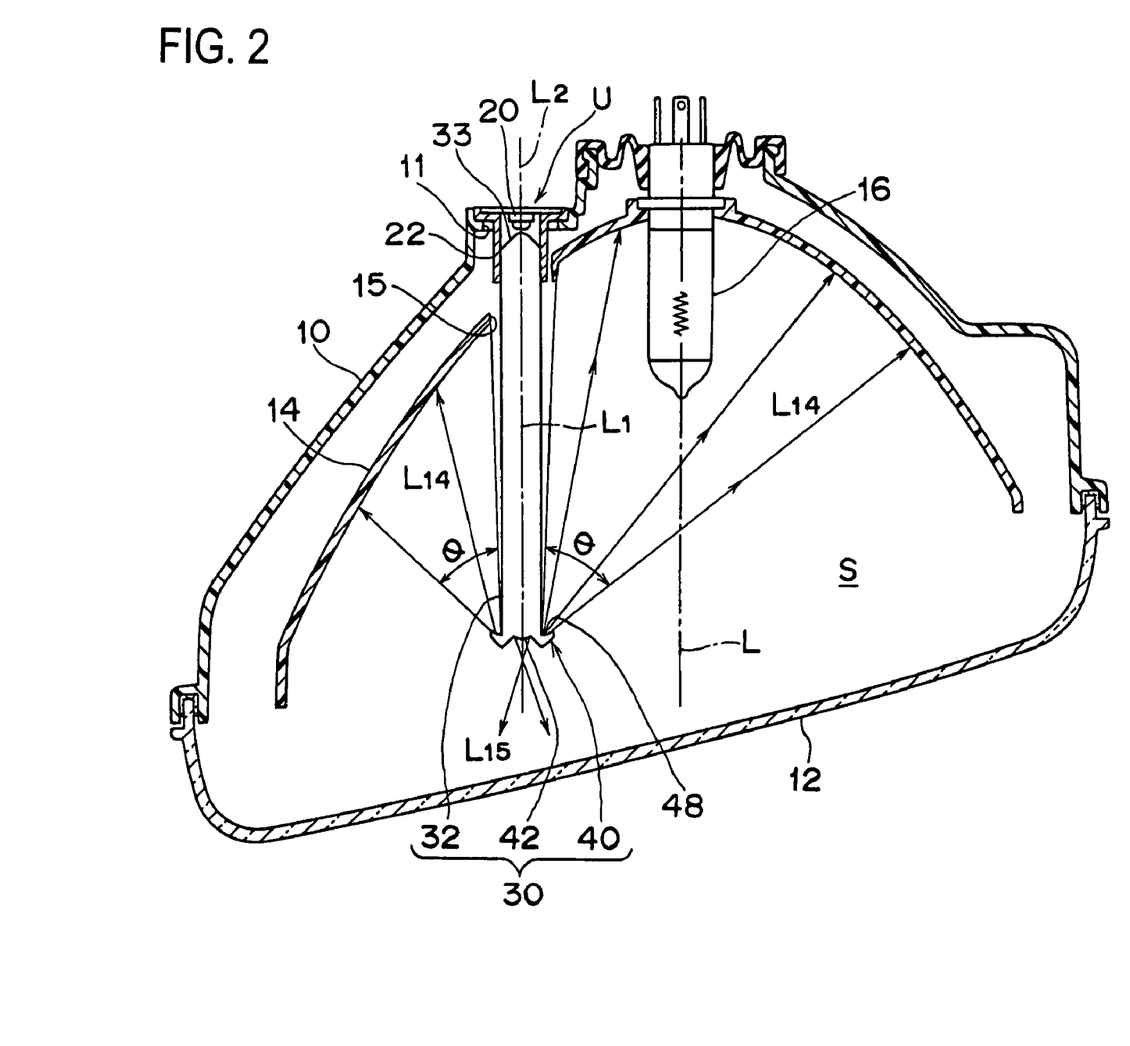
FIG. 2 is an enlarged horizontal sectional view of the headlamp taken along the line II—II in FIG. 1.
Figure 3:
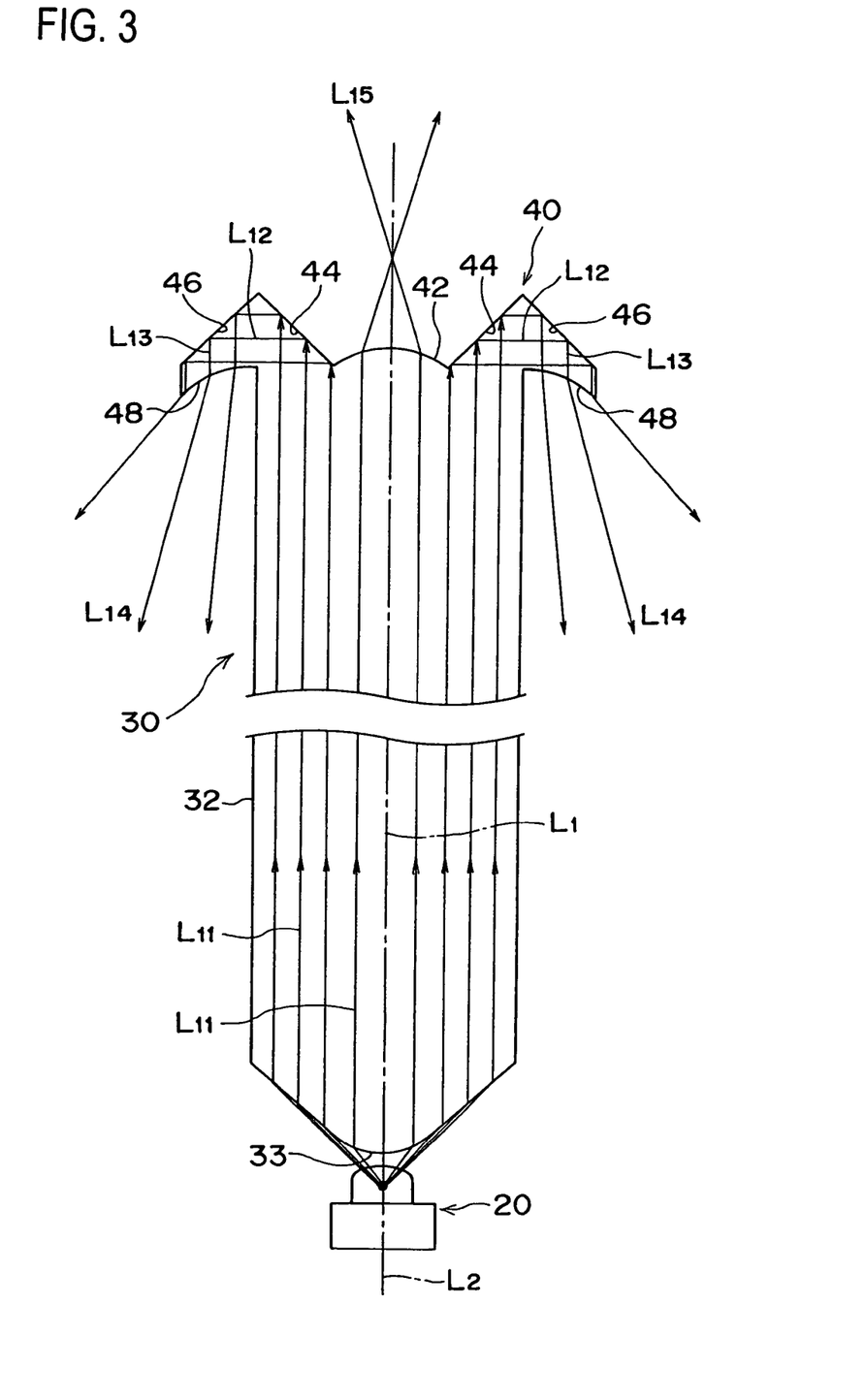
FIG. 3 shows light guiding paths of the light guide used in the headlamp.

FIGS. 1 to 3 show the first embodiment of the present invention that is applied to an automotive headlamp which incorporates a clearance lamp. FIG. 1 is a front elevational view of the headlamp, and FIG. 2 is a horizontal sectional view of the headlamp (taken along the line II—II in FIG. 1). FIG. 3 is a view showing the light guiding path of the light guide.

In FIGS. 1 to 3, the reference numeral 10 denotes a vessel-like lamp body of the automotive headlamp that has an open front face. The front open portion is covered with a front lens (a front cover which is not formed with steps) to define a lamp chamber S. A reflector 14 through which a headlamp bulb 16 is inserted is housed in the lamp chamber S. The inner side of the reflector 14 is formed with a reflecting surface on which aluminum is deposited. The reflecting surface is provided with steps (not shown) for light distribution control. Light emitted from the bulb 16 is reflected by the reflector 14 and distributed in the forward direction (downward in FIG. 2), so that a predetermined light distribution pattern is formed.

An aiming mechanism E constructed of one aiming fulcrum $E_0$ having a ball joint structure and two aiming screws $E_1$ and $E_2$ as best seen from FIG. 1 are provided between the reflector 14 and the lamp body 10, so that tilt adjustment (aiming) of the reflector 14 (along the an optical axis L of the headlamp) is performed around a horizontal tilting axis Lx and a vertical tilting axis Ly, respectively.

Moreover, next to the bulb 16 (on the inner side of the vehicle width direction; left side in FIG. 2) is provided with a clearance lamp that is comprised of an LED 20 which is fixed to the lamp body 10 and emits white light and a light guide 30 which is disposed in front of the LED 20 in parallel with the optical axis L of the head lamp and guides light emitted from the LED 20 to the reflector 14.

The light guide 30 has a mushroom shape in which an umbrella portion 40 is formed at a front end of a bar-shaped base portion 32 thereof and constructed of a molded unit of transparent resin such as acrylic. The light guide 30 is fixed to the lamp body 10 at its rear end portion and penetrates through an opening 15 provided in the reflector 14, so that its front end portion extends significantly in the forward direction. Light incident to the light guide 30 from the rear end portion of the bar-shaped base portion 32 is emitted toward the reflector 14 from a light emitting surface 48 that is formed on the back-face side of the umbrella portion 40 of light guide 30 through internal reflection at the umbrella portion 40; and then the emitted light is reflected by the reflector 14 that emits light through the front lens 12 (to function as a clearance lamp).

More specifically, as best seen from FIG. 3, the bar-shaped base portion 32 of the light guide 30 is formed in a cylindrical shape that has an equal outer diameter in an axial direction thereof, and the rear end portion of the bar-shaped base portion 32 is formed with a plane of incidence 33 for guiding light emitted from the LED 20 into the light guide 30 (the bar-shaped base portion 32) so that the light is in the form of substantially parallel fluxes. Accordingly, light emitted from the LED 20 that is incident to the light guide 30 from (the plane of incidence 33 of) the rear end portion of the bar-shaped base portion 32 is guided in the forward direction of the light guide 30 through its bar-shaped base portion 32 in the form of the substantially parallel fluxes as shown by arrows $L_{11}$ in FIG. 3.

The umbrella portion 40 at the front end of the light guide 30 (the bar-shaped base portion 32) is provided with a circular first light emitting surface 42, a ring-shaped first internal reflection surface 44, a ring-shaped second internal reflection surface 46, and a ring-shaped second light emitting surface 48. The first light emitting surface 42 is for emitting a part of the guided light $L_{11}$ within the bar-shaped base portion 32 in the forward direction. The first internal reflection surface 44 is for internally reflecting a part of the guided light $L_{11}$ within the bar-shaped base portion 32 in the outward direction which is orthogonal to the optical axis $L_1$ of the bar-shaped base portion 32 of the light guide 30, and the second internal reflection surface 46 is for internally reflecting the internally reflected light (light reflected by the first internal reflection surface 44) $L_{12}$ so that the light $L_{12}$ changes into light $L_{13}$ which is in parallel with the optical axis $L_1$ and directed rearward of the light guide 30. The second light emitting surface 48 is for emitting the light $L_{13}$ reflected by the second internal reflection surface 46 toward the reflector 14.

The first internal reflection surface 44 and the second internal reflection surface 46 are formed as a tilted surface that is tilted by 45 degrees with respect to the optical axis $L_1$, so that the light $L_{13}$ that is internally reflected twice and directed toward the second light emitting surface 48 becomes a beam parallel to the optical axis $L_1$. The second light emitting surface 48 is formed as a concave surface (concave lens) so that light emitted through the second light emitting surface 48 is diffused only outward in the radial direction of the umbrella portion 40, so that light $L_{14}$ is thereby emitted from the second light emitting surface 48 and is guided as diffused light only within the area that is indicated by θ in FIG. 2. Then, by the light reflection at the reflector 14 to which the emitted light (diffused light) $L_{14}$ is guided, light is emitted through the front lens 12.

The second light emitting surface 48 has a concave shape (concave lens) by which the light to be emitted therethrough is diffused only outward in the radial direction of the umbrella portion 40; accordingly, the emitted light $L_{14}$ from the second light emitting surface 48 is not directed in a direction which crosses the optical axis $L_1$ of the bar-shaped base portion 32 of the light guide 30. Therefore, the diffused light $L_{14}$ from the second light emitting surface 48 is efficiently guided to the reflector 14 without being reflected by the bar-shaped base portion 32, thus contributing to light emission of the front lens 12.

Light entered the light guide 30 leaks, though by small amount, from the surface of the bar-shaped base portion 32 of the light guide. With such a small amount of light leak, light is slightly emitted from the front lens 12, contributing to the lighting of the clearance lamp.

Moreover, the first light emitting surface 42 provided in the center of the top face of the umbrella portion 40 is convex. Thus, diffused light $L_{15}$ is emitted along the optical axis $L_1$ and acts to compensate for insufficient light emission in the area, which corresponds to the light guide 30, of the front lens 12.

More specifically, since the light guide 30 significantly extends in front of the reflector 14 as seen from FIG. 2, light reflected by the reflector 14 may be blocked by (the umbrella portion 40 of) the light guide 30 and a shadow of the light guide 30 might appear in the light guide-corresponding area of the front lens 12. However, since the diffused light $L_{15}$ emitted from the first light emitting surface (convex surface) 42 of the umbrella portion 40 is guided to this area, the shadow of the light guide 30 is prevented from appearing on the front lens 12. Moreover, the diffused light $L_{15}$ guided to the light guide-corresponding area of the front lens 12 reduces the differences in brightness of the light emission area of the front lens 12 (such an area corresponds to (or faces) the reflector 14 and is a light emission area of the front lens 12 to which the emitted light $L_{14}$ reflected by the reflector 14 is guided). Thus, the diffused light $L_{15}$ acts to make the brightness of the entire light emission area of the front lens 12 substantially uniform.

Furthermore, so as to diffuse the emitted light $L_{15}$ from the first light emitting surface 42, the first light emitting surface 42 can be a concave surface (concave lens) instead of the above-described convex surface (convex lens). However, if the first light emitting surface 42 is concave, light emitted from the concave surface can be reflected by the first internal reflection surface 44 provided to surround the concave surface. Therefore, it is preferable that the first light emitting surface 42 be a convex surface which temporarily condenses and then diffuses light and has no risk of reflection of the light by the first internal reflection surface 44.

Moreover, the entire light guide 30 is substantially a solid cylinder, and it has the optical axis $L_1$ of the bar-shaped base portion as its central axis, and the first and second internal reflection surfaces 44 and 46 and the second light emitting surface 48 are formed so as to concentrically extend in a ring shape from the entire circumference with respect to the first light emitting surface (convex surface) 42 at the center.

Because of the structure described above, when designing the plane of incidence 33, the first light emitting surface 42, the first and second internal reflection surfaces 44 and 46 and the second light emitting surface 48, it is merely required to make a sectional shape (two dimensional sectional shape) of the light guide 30 (including the umbrella portion 40 and the bar-shaped base portion 32) which runs along the optical axis $L_1$ of the bar-shaped base portion 32. Thus, designing of the light guide 30 is remarkably easy.

In the shown embodiment, the rear end portion of the light guide 30 (the bar-shaped base portion 32) is fixed to a cylindrical LED case 22 which accommodates the LED 20, and the light guide 30 is integrated as a light source unit U in such a manner that the optical axis $L_1$ of the light guide 30 (the bar-shaped base portion 32) coincides with the optical axis $L_2$ of the LED 20. The light source unit U is inserted from the back of the lamp body 10 into the light guide mounting hole 11 of the lamp body 10 and is then fixed by fixing means (not shown). Accordingly, the light source unit U is installed and removed easily from the back of the lamp body 10.

In the above-described embodiment, the emitted light $L_{14}$ from the second light emitting surface 48 of the umbrella portion 40 of the light guide 30 is not guided to the entire reflector 14 as shown in FIG. 2, and therefore, light is not emitted from the entire front lens 12. However, with the use of a light guide 30 (the bar-shaped base portion 32) that is sufficiently large in length, the second light emitting surface 48 of the umbrella portion 40 can be set to be further away from the reflector 14; and this allows most of the emitted light $L_{14}$ to be guided to substantially the entire reflector 14 so that light is emitted from substantially the entire front lens 12.

Figure 4:
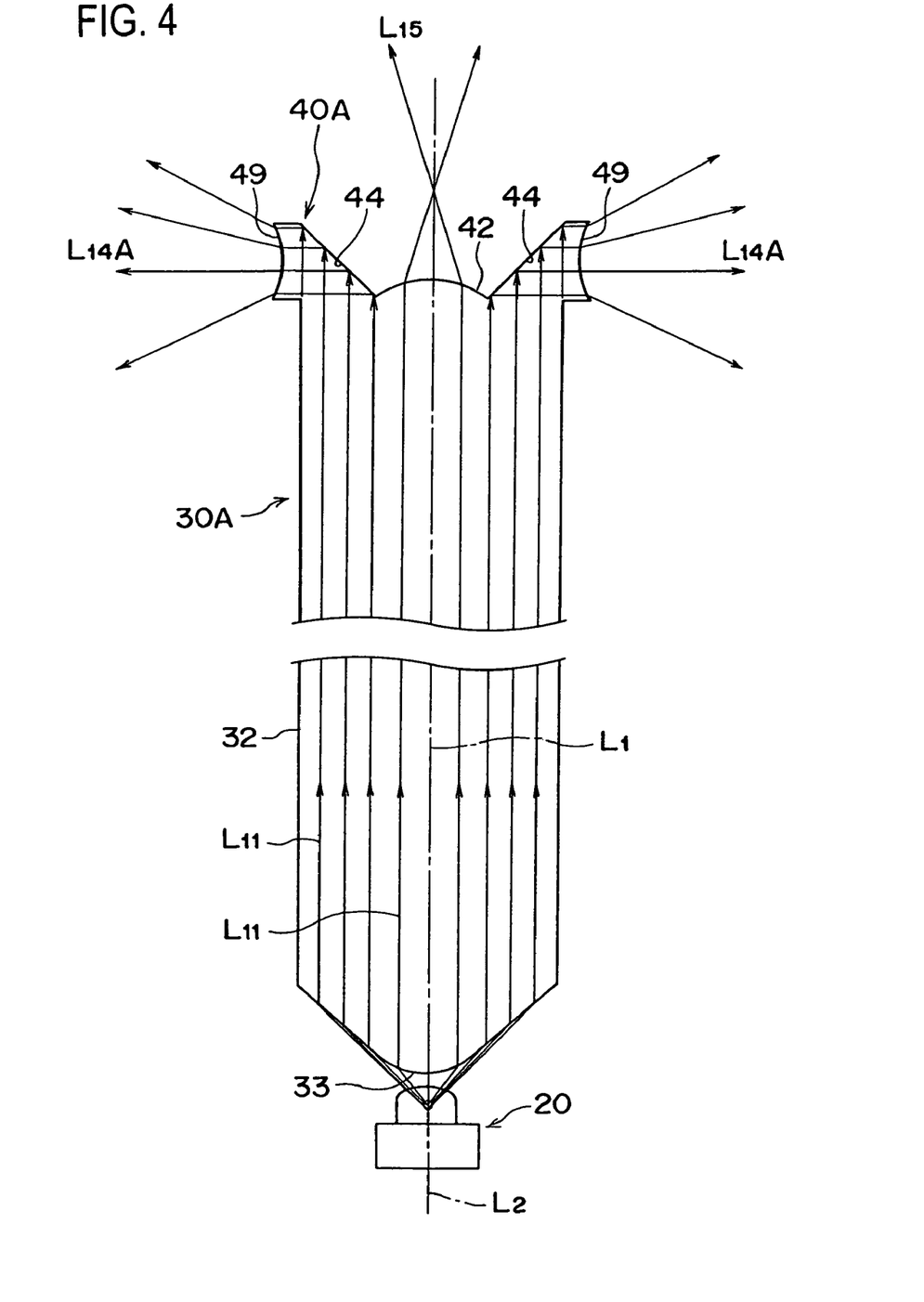
FIG. 4 shows light guiding paths of the light guide according to a second embodiment of the present invention.

FIG. 4 shows a main portion of a second embodiment of the present invention (FIG. 4 corresponding to FIG. 3 of the above-described first embodiment), illustrating the light guiding path in the light guide.

The umbrella portion 40 of the first embodiment has two internal reflection surfaces 44 and 46 so that they are mutually orthogonal to each other, so that the emitted light $L_{14}$ from the umbrella portion 40 is directed from the rear area of the umbrella portion 40 to the outside. To the contrary, in the second embodiment shown in FIG. 4, the internal reflection surface of the umbrella portion 40A of the light guide 30A is constituted solely by a first reflecting surface 44 that is formed as a tilted surface tilted by 45 degrees with respect to the optical axis $L_1$ of the bar-shaped base portion 32 of the light guide 30A; and the outer periphery of the umbrella portion 40A is formed with a concave second light emitting surface 49 (thus being a concave lens) so that the second light emitting surface 49 of the umbrella portion 40A emits light $L_{14}A$ to the areas that are on the side of the light guide 30A.

Other portions of the light guide 30A are the same as the light guide 30 of the first embodiment described above, and repeated descriptions thereof is omitted.

In the second embodiment, the longitudinal length of the light guide 30A (the bar-shaped base portion) 32 needs to be shortened to some extent compared to the first embodiment such that all of the emitted light $L_{14}A$ from (the light emitting surface 49 of) the umbrella portion 40A is guided to the reflector 14 (refer to FIG. 2).

In the above-described first and second embodiments, the present invention is described on a clearance lamp integrated with an automotive headlamp. However, the present invention is applicable to other marker lamps such as a tail lamp and a stop lamp integrated with an automotive headlamp, and it can be applied to an individual marker lamp including a clearance lamp, a tail lamp and a stop lamp or other lamps.

As seen from the above, in the vehicular lamp according to the first aspect of the present invention, light is substantially uniformly emitted from the entire large area, corresponding to the reflector, of the front lens by lighting a single LED. Consequently, it is possible to use less number of LEDs as the light sources of a lamp, and the lamp is provided at a low cost correspondingly.

Moreover, since the light guide can be simply fixed and held to the reflector, the lamp structure is not complicated.

According to the second aspect of the present invention, light is substantially uniformly emitted from the entire area, corresponding to the reflector, of the front lens. Accordingly, the lamp has an improved visibility correspondingly.

According to the third aspect of the present invention, since the optical design of the light guide is simple, manufacturing of the light guide is correspondingly easy.

According to the fourth aspect of the present invention, design of the shape of the umbrella portion, that is, optical design of the first light emitting surface, the internal reflection surface and the second light emitting surface is simple, and thus, manufacturing of the light guide is correspondingly easy.

According to the fifth aspect of the present invention, since a part of light emitted from the LED is substantially uniformly guided to the large area of the reflector through the light guide, the light emission area of the front lens is large, thus improving the visibility of the lamp.

What is claimed is:

1. A vehicular lamp comprising, within a lamp chamber defined by a lamp body and a front lens, a reflector, a LED which is a light source of the lamp and is provided in an area behind the reflector, a light guide in which an umbrella portion is formed at a front end of a bar-shaped base portion and which is provided in front of the LED so as to be substantially coaxial with an optical axis of the LED so as to guide light emitted from the LED to the reflector; wherein
   a rear end portion of the bar-shaped base portion is provided with a plane of incidence for guiding light emitted from the LED into the light guide in a form of substantially parallel light fluxes; and
   the umbrella portion is formed with:
      a first light emitting surface for emitting a part of guided light within the bar-shaped base portion in a forward direction of the vehicular lamp,
      an internal reflection surface for internally reflecting a part of guided light outward in a radial direction of the umbrella portion, and
      a second light emitting surface for emitting the internally reflected light toward the reflector.

2. The vehicular lamp according to claim 1, wherein the first light emitting surface is a convex surface for diffusing light to be emitted therethrough.

3. The vehicular lamp according to claim 1, wherein the internal reflection surface is comprised of:
   a first reflecting surface set tilted at an angle substantially 45 degrees with respect to an optical axis of the bar-shaped base portion, and
   a second reflecting surface for reflecting light internally reflected by the first reflecting surface in a rearward direction of the vehicular lamp.

4. The vehicular lamp according to claim 3, wherein:
   the bar-shaped base portion is constructed of a cylinder that has an outer diameter substantially constant in an axial direction thereof, and
   the umbrella portion has a central axis that coincides with an optical axis of the bar-shaped base portion and comprised of the first light emitting surface, which is at a center thereof, and the internal reflection surface and the second light emitting surface, which extend in a ring shape along entire circumferences of the first light emitting surface concentrically.

5. The vehicular lamp according to claim 4, wherein the second light emitting surface is constructed of a concave surface for diffusing light to be emitted therethrough only outward in a radial direction of the umbrella portion.

6. The vehicular lamp according to claim 3, wherein the second light emitting surface is constructed of a concave surface for diffusing light to be emitted therethrough only outward in a radial direction of the umbrella portion.

7. The vehicular lamp according to claim 1, wherein:
   the bar-shaped base portion is constructed of a cylinder that has an outer diameter substantially constant in an axial direction thereof, and
   the umbrella portion has a central axis that coincides with an optical axis of the bar-shaped base portion and comprised of the first light emitting surface, which is at a center thereof, and the internal reflection surface and the second light emitting surface, which extend in a ring shape along entire circumferences of the first light emitting surface concentrically.

8. The vehicular lamp according to claim 7, wherein the second light emitting surface is constructed of a concave surface for diffusing light to be emitted therethrough only outward in a radial direction of the umbrella portion.

9. The vehicular lamp according to claim 1, wherein the second light emitting surface is constructed of a concave surface for diffusing light to be emitted therethrough only outward in a radial direction of the umbrella portion.

10. The vehicular lamp according to claim 9, wherein the second light emitting surface is constructed of a concave surface for diffusing light to be emitted therethrough only outward in a radial direction of the umbrella portion.

* * * * *